United States Patent [19]

Hess et al.

[11] Patent Number: 4,806,603
[45] Date of Patent: Feb. 21, 1989

[54] POLYESTER RESIN COMPOSITIONS WHICH CAN BE HARDENED WITH LITTLE SHRINKAGE

[75] Inventors: Bernhard Hess, Moers; Bert Brassat; Oskar Walter, both of Krefeld, all of Fed. Rep. of Germany

[73] Assignee: Bayer Aktiengesellschaft, Leverkusen, Fed. Rep. of Germany

[21] Appl. No.: 72,432

[22] Filed: Jul. 13, 1987

[30] Foreign Application Priority Data

Jul. 25, 1986 [DE] Fed. Rep. of Germany ....... 3625184

[51] Int. Cl.$^4$ .............................................. C08L 67/06
[52] U.S. Cl. .................................... 525/445; 523/522; 523/523; 523/526; 524/39; 525/7.4; 525/64; 525/170; 525/440; 525/447
[58] Field of Search .................. 525/445, 447, 7.4, 64, 525/170, 440; 524/39; 523/522, 523, 526

[56] References Cited

U.S. PATENT DOCUMENTS

| | | | |
|---|---|---|---|
| 2,418,633 | 4/1947 | Gould | 525/445 |
| 2,423,042 | 6/1947 | Muskat | 528/304 |
| 2,516,309 | 7/1950 | Fraser | 525/445 |
| 2,882,256 | 4/1959 | Waychoff | 525/27 |
| 3,701,748 | 10/1972 | Kroekel | 523/523 |
| 4,100,224 | 7/1978 | Hess | 525/170 |
| 4,230,813 | 10/1980 | Cooke | 525/170 |
| 4,263,198 | 4/1981 | Feldman et al. | 525/19 |

*Primary Examiner*—Patricia Short
*Attorney, Agent, or Firm*—Connolly & Hutz

[57] ABSTRACT

Polyester-based mouldings which have been hardened with little shrinkage, do not stick in the mould and therefore can be released from the mould without damage are accessible via moulding compositions containing an unsaturated polyester of defined acid number and certain end groups.

6 Claims, No Drawings

POLYESTER RESIN COMPOSITIONS WHICH CAN BE HARDENED WITH LITTLE SHRINKAGE

The invention relates to compositions based on unsaturated polyester resins, that is to say mixtures of $\alpha,\beta$-ethylenically unsaturated polyesters and monomers which can be copolymerized with these, and additives which reduce shrinkage. They are suitable for the production of glass fibre-reinforced mouldings which, after hardening, can be released from the mould without damage because they do not stick.

Moulding compositions based on unsaturated polyester resins with additions of reinforcing agents, such as glass fibres, and if appropriate fillers give mouldings of high strength, rigidity, heat distortion point and resistance towards solvents and other chemicals on hardening. They are therefore valuable construction materials. So that components which are free from sink spots, distortion phenomena, internal strains and surface waviness can be produced from them, shrinkage-reducing additives—so-called low profile (LP) additives—are added to them.

It is known that fibre-reinforced unsaturated polyester resins which are to be processed by pressing or injection moulding are as a rule thickened or converted into a so-called "B state". By this is understood a chemical or physical operation which imparts to the material a high viscosity which is advantageous for non-tacky handling, perfect filling of the mould and uniform transportation of the fillers and reinforcing substances during moulding. It is therefore possible for mixing of the polyester resin with the other constituents to be carried out at a low resin viscosity and optimum wetting of the reinforcing substances by the resin thus to be achieved, without the reinforcing fibres being destroyed by too powerful a kneading or shearing action.

The process customary in practice for thickening unsaturated polyester resins uses alkaline earth metal oxides or hydroxides, in particular magnesium oxide, as a chemical thickening agent.

To produce large-area pressed mouldings, for example car body components, a so-called sheet moulding compounds (=SMC) are used in practice. The "wet" resin mats prepared from glass fibre mats by impregnation with polyester resin containing thickening agent thicken within a certain maturing time and then have a dry surface and can be cut in this state and pressed.

Smaller mouldings are in practice produced from bulk moulding compounds (=BMC). Their composition is similar to that of the resin mats described above, but—in addition to the shorter fibre length—they differ by a usually somewhat higher filler content and the absence of a thickening agent. Omission of the thickening agent is associated with the advantage that BMC compositions can be processed immediately after preparation, but can also be stored for a prolonged period without their viscosity changing substantially.

On transition to larger mouldings, there is also a need for LP additives for sauerkraut compositions, so that the dimensional accuracy and surface smoothness of the mouldings are guaranteed. Whilst there are in principle no difficulties in the processing of BMC compositions which are free from LP additives, it has been found that LP additives make the hardened mouldings stick, so that these must be released from the mould with force and are thereby often damaged. This disadvantage cannot be eliminated by using even relatively large amounts of mould release agents, for example zinc stearate.

The object of the invention was therefore to provide polyester resin compositions which can be hardened with little shrinkage and do not have these disadvantages.

Surprisingly, the problem can be solved by using a selected polyester.

The present invention thus relates to polyester resin-based compositions which can be hardened with little shrinkage and comprise (A) 20 to 70% by weight of an $\alpha,\beta$-ethylenically unsaturated polyester with 0.4 to 0.7 equivalent of $\alpha,\beta$-ethylenically unsaturated double bonds per 100 g of polyester A, (B) 20 to 55% by weight of vinyl or vinylidene compounds which can be copolymerized with the polyester A, C) 8 to 25% by weight of a shrinkage-reducing polymer, the percentage data in each case relating to the sum of A+B+C, and, if appropriate, (D) other additives, characterized in that the polyester A has an acid number of less than 28, preferably less than 26, and contains 0.5 to 10, preferably 1 to 5% by weight, based on the polyester A, of cocondensed radicals of monohydric aliphatic $C_4$–$C_{18}$-alcohols and/or aliphatic $C_4$–$C_{18}$-monocarboxylic acids.

Although the end group modification of unsaturated polyesters with monohydric alcohols or monocarboxylic acids is known from the prior art (U.S. Pat. Nos. 2,423,042, 2,516,309 and 2,882,256 and DE-AS (German Published Specification) No. 3,426,425, it is rarely practised.

The effect according to the invention is surprising. In retrospect, it is also inexplicable why, for example, short-chain monohydric alcohols, such as, for example, methanol, cycloaliphatic alcohols, such as, for example, cyclohexanol, or aromatic monocarboxylic acids, such as, for example, benzoic acid, do not give the desired effect. The end groups to be used according to the invention also do not lead to success, however, if the acid number of the polyester A does not at the same time fall below a certain number.

$\alpha,\beta$-Ethylenically unsaturated polyesters A in the context of the invention are the customary polycondensation products of at least 80 mol-%, based on the dicarboxylic acid component, of at least one $\alpha,\beta$-ethylenically unsaturaed dicarboxylic acid with as a rule 4 or 5 C atoms or ester-forming derivatives thereof, it appropriate mixed with up to 20 mol-%, based on the dicarboxylic acid component, of at least one aliphatic saturated dicarboxylic acid with 4 to 10 C atoms, one cycloaliphatic or aromatic dicarboxylic acid with 8 to 10 C atoms or ester-forming derivatives thereof with at least one polyhydroxy compounds, in particular a dihydroxy compound, with 2 to 8 C atoms—that is to say polyesters such as are described in J. Bjorksten et al. "Polyesters and their Applications", Reinhold Publishing Corp., New York 1956.

Examples of unsaturated dicarboxylic acids or their derivatives which are preferably to be used are maleic acid or maleic anhydride and fumaric acid. However, mesaconic acid, citraconic acid, itaconic acid or chloromaleic acid, for example, can also be used. Examples of the aliphatic saturated, cycloaliphatic or aromatic dicarboxylic acids or their derivatives to be used are phthalic acid, phthalic anhydride, isophthalic acid, terephthalic acid, hexa- or tetrahydrophthalic acid and anhydrides thereof, endomethylenetetrahydrophthalic acid and the anhydride thereof, succinic acid and succinic anhydride, succinic acid esters and chlorides, glutaric acid, adipic acid and sebacic acid. In order to prepare resins which are difficult to ignite, hexachloroendomethylenetetrahydrophthalic acid, tetrachlorophthalic acid or tetrabromophthalic acid, for example, can be used. Polyesters which are preferably to be used contain maleic esters which are preferably to be used contain maleic acid radicals, up to 20 mol-% of which can be replaced by phthalic acid or isophthalic acid radicals. Dihydric alcohols which can be used are ethylene glycol, propane1,2-diol, propane-1,3-diol, diethylene glycol, triethylene glycol, dipropylene glycol, butane-1,3-diol, butane1,4-diol, neopentyl glycol, hexane-1,6-diol, 2,2-bis-(4-hydroxycyclohexyl)-propane, bis-oxyalkylated bisphenol A and others. Ethylene glycol, propane-1,2-diol, diethylene glycol, dipropylene glycol and neopentyl glycol are preferably used.

Preferred monohydric alcohols or monocarboxylic acids with 4 to 18 C atoms for introducing the end groups required according to the invention are, for example, n-butanol, sec.-butanol, pentyl, hexyl, heptyl, octyl or dodecyl alcohol in branched or non-branched form, stearyl alcohol, valeric acid, lauric acid, palmitic acid and stearic acid. The monohydric alcohols are preferable to the monocarboxylic acids, since these give pressed mouldings with a deposit-free glossy surface. 2-Ethyl-hexan-1-ol is particularly preferred.

The "radicals", according to the claims, of monohydric alcohols and monocarboxylic acids are the radical RO- formed from alcohols ROH by removal of a hydrogen atom or the radical R'—CO— formed from a monocarboxylic acid R'COOH by removal of a hydroxyl group.

The OH numbers of the polyester A should be between 10 and 150, preferably between 20 and 100, and the molecular weights $M_n$ should be between about 500 and 5000, preferably between about 1000 and 3000 measured by vapour pressure osmometry in dioxane and acetone; if the values differ, the lower is regarded as the correct value).

The polyesters A should preferably have a minimum viscosity of 800 mPa.s, measured as a 65% strength by weight solution in styrene at 20° C.

The content of radicals of $\alpha,\beta$-ethylenically unsaturated double bonds is determined by mercaptan addition in accordance with the method of Organic Analysis, Volume III, page 315, New York—London 1956, the acid numbers are determined in accordance with DIN 53 403, and the OH numbers are determined in accordance with DIN No. 53 240.

The unsaturated polyesters A can be prepared by the known esterification processes, for example the melt or azeotrope process, by a continuous or discontinuous procedure.

Copolymerizable vinyl and vinylidene compounds B which are suitable in the context of the invention are the unsaturated monomers which are customary in polyester technology and preferably carry $\alpha$-substituted vinyl groups or $\beta$-substituted allyl groups, preferably styrene; but also, for example, nuclear-chlorinated and -alkylated or -alkenylated styrenes, it being possible for the alkyl groups to contain 1 to 4 carbon atoms, such as, for example, vinyltoluene, divinylbenzene, $\alpha$-methylstyrene, tert.-butylstyrene, chlorostyrenes and vinyl esters of carboxylic acids with 2 to 6 carbon atoms, preferably vinyl acetate; vinylpyridine, vinylnaphthalene, vinylcyclohexane, acrylic acid and methacrylic acid and/or their esters (preferably vinyl, allyl and methallyl esters) with 1 to 4 carbon atoms in the alcohol component, their amides and nitriles; and allyl compounds, such as allylbenzene and allyl esters, such as allyl acetate, diallyl phthalate, diallyl isophtalate, diallyl fumarate, allyl carbonates, diallyl carbonate, triallyl phosphate and triallyl cyanurate.

Preferred shrinkage-reducing polymers (C) are, for example, high molecular thermoplastic polymers (German Patent Specification No. 1,694,857), for example polymers of acrylic and methacrylic acid esters, such as polymethyl methacrylate and polyethyl acrylate, homopolymers, copolymers and graft polymers of ethylene and/or vinyl compounds, such as polystyrene and polyvinyl acetate, and cellulose esters, such as cellulose acetatepropionate and -butyrate, it being possible for the molecular weights to be between 10,000 and 10,000,000. Substances with a low molecular weight which are liquid to resinous at room temperature and therefore are not "thermoplastics" in the conventional sense but have the character of plasticizers have also been recommended as LP additives (Austrian Patent Specification No. 220,369), thus, for example, dibutyl phthalate and polypropylene adipate. Combinations of LP additives from the two groups of substances have also been described as advantageous (DE-OS (German Published Specification) No. 3,426,425). Polyurethanes with average molecular weights (determined by membrane osmosis) of 1000 to 1,000,000, preferably 2000 to 500,000, have also proved to be advantageous. Polyurethane adipates with a urethane group content of 0.001–0.7, preferably 0.01–0.3 equivalent per 100 parts by weight of polyurethane are particularly preferred.

Shrinkage-reducing polymers (C) with free carboxyl groups corresponding to an acid number of 2 to 25 can also be used (German Patent Specification No. 1,953,062).

Other additives (D) in the context of the invention are, for example, inert inorganic fillers, such as calcium carbonate, silicates, aluminas, lime, charcoal, reinforcing fibres, such as glass fibres, carbon fibres and synthetic organic fibres, cotton, asbestos or metal fabric, organic and inorganic pigments, dyestuffs, lubricants and release agents, such as zinc stearate, UV absorbers and the like.

For stabilization, the customary polymerization inhibitors which prevent premature uncontrolled gelling, for example hydroquinone, toluhydroquinone, p-benzoquinone, p-tert.-butylpyrocatechol, chloranil, naphthoquinone, copper compounds or p-nitrosodimethylaniline, are added in effective amounts to the compositions according to the invention.

Examples of suitable hardening catalysts are benzoyl peroxide, tert.-butyl perbenzoate, tert.-butyl peroxide, cyclohexanone peroxide, tert.-butyl peroctoate, azoisobutyrodinitrile, cumene hydroperoxide or silyl ethers of benzopinacol, in the customary amounts.

The resin mixtures can be prepared most easily by combining the solutions of components (A) and (C) in component (B) with stirring at room temperature or slightly elevated temperature. Polymerization inhibitors, agents which form free radicals and the customary additives can be incorporated, for example, in kneaders or dissolvers or on an roll mill.

The BMC pressing compositions mentioned, have, for example, the following composition: 100–400, preferably 150–300 parts by weight of inorganic fillers, 30–150, preferably 50100 parts by weight of glass fibres and 0.5–5 parts by weight of hardening catalysts are incorporated into 100 parts by weight of resin mixture (components A to C).

The pressing compositions can be hardened under a pressure of about 20 to 140 kp/cm2 at about 120° to 160° C.—depending on size and shape—in the course of about 0.5 to 5 minutes.

They are outstandingly suitable for the production of a large number of mouldings, for example headlamp reflectors, coil formers, car doors, engine bonnets and boot lids.

The percentage data in the following examples denote percentages by weight.

EXAMPLES

The unsaturated polyesters shown below were prepared by melt condensation. They were in each case stabilized with 0.02% of hydroquinone, based on the unsaturated polyester, and then dissolved in styrene to give a 65% strength solution. The solutions of the examples according to the invention were each called components A1) to A7), and those of the comparison examples were called AV1) to AV4). The viscosity figures for the styrene solutions are based on measurements at 20° C. in a rotary viscometer. The molar composition of the unsaturated polyesters, their characteristic parameters and the mould release properties of pressed mouldings obtained from the unsaturated polyesters mentioned in a low-shrinkage formulation are listed below in tabular form.

| Composition of the mixtures: | |
|---|---|
| Components A1 to A7 and AV1 to AV4 in each case: | 57.00 parts by weight |
| Component C1L | 25.00 parts by weight |
| Component C2L | 9.00 parts by weight |
| Styrene (Component B) | 9.00 parts by weight |
| Examples and comparison examples: | 100.00 parts by weight |
| Tertiary-butyl perbenzoate, 95% pure | 1.00 part by weight |
| p-benzoquinone, 10% strength in styrene | 0.20 part by weight |
| Zinc stearate | 6.00 parts by weight |
| Chalk | 250.00 parts by weight |
| Glass fibres, 12 mm in length | 89.00 parts by weight |

Hardenable moulding composition: 446.20 parts by weight

| Component | AV1 | AV2 | A1 | A2 | A3 | A4 | A5 | AV3 | AV4 | A6 | A7 |
|---|---|---|---|---|---|---|---|---|---|---|---|
| Maleic anhydride | 1.00 | 1.00 | 1.00 | 1.00 | 1.00 | 1.00 | 1.00 | 1.00 | 1.00 | 1.00 | 1.00 |
| Propylene 1,2-glycol | 1.10 | 1.07 | 1.11 | 1.11 | 1.11 | 1.07 | 1.11 | 1.09 | 1.10 | 1.11 | 1.18 |
| Methanol | 0.13 | 0.27 | — | — | — | — | — | — | — | | |
| n-Butan-1-ol | — | — | 0.06 | — | — | — | — | — | — | | |
| sec.-Butan-2-ol | — | — | — | 0.06 | — | — | — | — | — | | |
| n-Hexanol | — | — | — | — | 0.04 | — | — | — | — | | |
| 2-Ethylhexan-1-ol | — | — | — | — | — | 0.03 | — | 0.03 | — | | |
| Dodecan-1-ol | — | — | — | — | — | — | 0.02 | — | — | | |
| Cyclohexanol | — | — | — | — | — | — | — | — | 0.04 | | |
| Stearyl alcohol | | | | | | | | | | 0.016 | |
| 2-Ethylhexanoic acid | | | | | | | | | | — | 0.03 |
| Acid number | 20 | 13 | 20 | 24 | 19 | 25 | 24 | 28 | 24 | 22 | 13 |
| Viscosity (mPas) | 1640 | 1651 | 1654 | 1562 | 1633 | 1566 | 1570 | 1556 | 1647 | 1605 | 1549 |
| Equivalent double bonds/ 100 g | 0.60 | 0.59 | 0.59 | 0.59 | 0.59 | 0.60 | 0.59 | 0.60 | 0.60 | 0.59 | 0.58 |
| Pressed moulding sticks: | yes | yes | no | no | no | no | no | yes | yes | no | no |

Styrene was used as component B.
The following were used as component C:
C1: A polyvinyl acetate containing carboxylic acid groups with an acid number of 7. The 40% strength solution of component C1 in styrene had a viscosity of 5000 mPas at 25° C.; it was called C1L.
C2: A polyester-urethane prepared by reaction of a polyester of 1 mol of adipic acid, 0.62 mol of ethylene glycol and 0.40 mol of propylene 1,2-glycol (acid number: 13, OH number: 30) with 0.025 mol of toluylene 2,5-diisocyanate. The 70% strength solution of component C2 in styrene, which was stabilized with 0.02% of benzoquinone, had a viscosity of 5000 mPas at 20° C. The urethane group content is 0.03 equivalent/100 g of polyester urethane. It was called C2L.

Preparation of the compositions according to the invention:

The mixtures of components A, B and C with the composition shown below were prepared in a kneader and, to demonstrate the advantages according to the invention, the mixtures were immediately further processed to moulding compositions with the filler and additives listed as well as glass fibres. The finished moulding compositions were pressed to sheets with the dimensions 300×300×2 mm in the course of 3 minutes at 150° C. under 70 bar. The sticking properties of the low-shrinkag sheets with a good surface and dimensional accuracy have already been shown in Table 1.

We claim:
1. Polyester resin-based compositions which can be hardened with little shrinkage, comprising
   (A) 20 to 70% by weight of an $\alpha,\beta$-ethylenically unsaturated polyester with 0.4 to 0.7 equivalent of a $\alpha,\beta$-ethylenically unsaturated double bonds per 100 g of polyester A,
   (B) 20 to 55% by weight of vinyl or vinylidene compounds which can be copolymerized with the polyester A,
   (C) 8 to 25% by weight of a shrinkage-reducing polymer, the percentage data in each case relating to the sum of A+B+C, characterized in that the polyester A has an acid number of less than 28, and contains 0.5 to 10% by weight, based on the polyester A, of cocondensed radicals of monohydric aliphatic $C_4$–$C_{18}$-alcohols and/or aliphatic $C_4$–$C_{18}$-monocarboxylic acids.

2. Compositions according to claim 1, characterized in that the polyester A has an acid number of less than 26.

3. Compositions according to claim 1, characterized in that the polyester A contains 1 to 5% by weight, based on the polyester A, of cocondensed radicals of monohydric aliphatic $C_4$–$C_{18}$-alcohols and/or aliphatic $C_4$–$C_{18}$-monocarboxylic acids.

4. Compositions according to claim 1, characterized in that the radicals of monohydric aliphatic alcohols are 2-ethyl-hexan-1-ol radicals.

5. Compositions according to claim 1, further comprising inert organic fillers, reinforcing fibres, organic pigments, inorganic pigments, dyestuffs, lubricants, release agents, UV absorbers or mixtures thereof.

6. A hardened-molding composition formed from the composition of claim 1.

* * * * *